United States Patent [19]

Iwase et al.

[11] 4,105,843

[45] Aug. 8, 1978

[54] PROCESS FOR PRODUCING HYDROCARBON RESINS HAVING IMPROVED COLOR AND THERMAL STABILITY BY HEAT TREATMENT WITH AN $\alpha,\beta$-UNSATURATED ANHYDRIDE

[75] Inventors: Yoshiyuki Iwase; Shigeru Katayama, both of Iwakuni; Takayuki Nakano, Ohtake, all of Japan

[73] Assignee: Mitsui Petrochemical Industries Ltd., Tokyo, Japan

[21] Appl. No.: 786,243

[22] Filed: Apr. 11, 1977

[30] Foreign Application Priority Data

Apr. 15, 1976 [JP] Japan .................................. 51-41874
Dec. 15, 1976 [JP] Japan ................................ 51-149829

[51] Int. Cl.² .......................... C08F 24/00; C08F 4/14; C08F 20/08
[52] U.S. Cl. ........................................ 526/77; 526/76; 526/204; 526/212; 526/272; 526/290
[58] Field of Search ..................... 526/75, 76, 77, 204, 526/290, 272

[56] References Cited

U.S. PATENT DOCUMENTS

| | | | |
|---|---|---|---|
| 2,977,310 | 3/1961 | Stuart | 526/75 |
| 3,043,789 | 7/1962 | Cyba | 526/75 |
| 3,211,681 | 10/1965 | Arakawa et al. | 526/290 |
| 3,334,061 | 8/1967 | House et al. | 526/290 |
| 3,655,629 | 4/1972 | Takahara | 526/290 |
| 3,766,215 | 10/1973 | Hesse et al. | 526/75 |
| 3,905,948 | 9/1975 | Vargiu et al. | 526/290 |

*Primary Examiner*—Herbert J. Lilling
*Attorney, Agent, or Firm*—Sherman & Shalloway

[57] ABSTRACT

A hydrocarbon resin having improved color and thermal stability is prepared from a petroleum cracking or reforming fraction containing cationically polymerizable hydrocarbons and having a boiling range of 140° to 280° C. The petroleum fraction is first heat-treated with an $\alpha, \beta$-unsaturated dicarboxylic acid anhydride at 50 to 250° C, and then polymerized in the presence of a catalyst. The hydrocarbon resin is useful as a binder component in hot-melt adhesives, pressure-sensitive adhesives and thermofusible traffic paints.

16 Claims, No Drawings

PROCESS FOR PRODUCING HYDROCARBON RESINS HAVING IMPROVED COLOR AND THERMAL STABILITY BY HEAT TREATMENT WITH AN α,β-UNSATURATED ANHYDRIDE

This invention relates to an improved process for producing hydrocarbon resins. More specifically, it relates to a process for producing hydrocarbon resins having reduced coloration and superior thermal stability which consist mainly of aromatic hydrocarbon units.

It has been well known to produce hydrocarbon resins by polymerizing a petroleum thermal cracking or reforming fraction containing unsaturated hydrocarbons using Friedel-Crafts catalysts. The hydrocarbon resins are classified into aliphatic hydrocarbon resins obtained by polymerizing a petroleum fraction containing aliphatic unsaturated hydrocarbons as main constituents and having a boiling range of from $-20°$ to $100°$ C., and aromatic hydrocarbon resins obtained by polymerizing a petroleum fraction containing aromatic unsaturated hydrocarbons as main constituents and having a boiling range of from $140°$ to $280°$ C. The aromatic hyrocarbon resins have lower thermal stability, stronger offensive odor and greater coloration than the aliphatic species. For this reason, it has previously been considered as difficult to use the aromatic hydrocarbon resins in applications which require superior thermal stability, a low degree of odor or freedom from odor, or a low degree of coloration, for example in hot-melt adhesives, pressure-sensitive adhesives, or thermofusible traffic paints.

Methods have previously been suggested for pretreating a petroleum fraction containing unsaturated hydrocarbons, mainly aliphatic unsaturated hydrocarbons, having a boiling point of not more than $280°$ C. and containing at least 5 carbon atoms to remove from it undesirable components which will worsen the color of hydrocarbon resins and/or form a gel (insoluble polymer), especially cyclodienes such as cyclopentadiene or methylcyclopentadiene. For example, U.S. Pat. No. 2,770,613 discloses a method for removing them by pre-heating the fraction at $90°$ to $140°$ C. to dimerize cyclodienes. Japanese Patent Publication No. 21737/68 discloses a method for removing these components by forming adducts with maleic anhydride at room temperature. These methods are superior for improving the color of hydrocarbon resins prepared from fractions containing relatively large amounts of cyclodienes such as cyclopentadiene or methylcyclopentadiene and having a boiling point of not more than $100°$ C. It has been found however that when these methods are applied to the pretreatment of a petroleum fraction having a boiling range of from $140°$ to $280°$ C. and containing aromatic unsaturated hydrocarbons as main constituents with a relatively low content of cyclodienes, the color of aromatic hydrocarbon resins obtained by polymerizing the pretreated fraction can hardly be improved presumably because the coloration-causing substances in it differ from those contained in the aliphatic unsaturated hydrocarbon-containing fraction; and moreover, the formation of gels cannot be inhibited, and no improvement can be achieved in thermal stability and odor which are seriously unsatisfactory with the aromatic hydrocarbon resins.

It is an object of this invention to provide an improved process for producing hydrocarbon resins by polymerizing a petroleum cracking or reforming fraction containing cationically polymerizable hydrocarbons and having a boiling range of from $140°$ to $280°$ C. to achieve improved color and thermal stability.

Another object of this invention is to provide a process for producing aromatic hydrocarbon resins having reduced coloration, superior thermal stability and low offensive odor.

Other objects and advantages of the present invention will become apparent from the following description.

According to the present invention, there is provided a process for producing a hydrocarbon resin having improved color and thermal stability, which comprises polymerizing a petroleum cracking or reforming fraction containing cationically polymerizable hydrocarbons and having a boiling range of from $140°$ to $280°$ C. in the presence of a polymerization catalyst, characterized in that the petroleum cracking or reforming fraction is heat-treated with an α,β-unsaturated dicarboxylic acid anhydride at a temperature of from $50°$ to $250°$ C. prior to the polymerization.

The "petroleum cracking or reforming fraction" used as a starting material in the process of this invention denotes a hydrocarbon-containing fraction which is formed as a by-product in the thermal or catalytic cracking (such as steam cracking, vapor phase cracking, or sand cracking) or reforming (such as hydroreforming) of petroleums such as naphtha, gas oils or kerosene. In the present invention, a petroleum cracking or reforming fraction having a boiling range of from $140°$ to $280°$ C., preferably $140°$ to $240°$ C., is used.

The petroleum cracking or reforming fraction having a boiling range of from $140°$ to $280°$ C. contains cationically polymerizable hydrocarbons and non-polymerizable hydrocarbons, most of which contain at least 8 carbon atoms. The hydrocarbons with at least 8 carbon atoms are contained generally in an amount of at least 90% by weight based on the weight of the fraction. Specifically, the composition of the petroleum fraction varies over a broad range according, for example, to the type of the petroleum cracked or reformed and the cracking or reforming conditions. According to the present invention, a fraction containing at least 20% by weight, preferably 30 to 75% by weight, more preferably 35 to 60% by weight, based on the weight of the fraction, of cationically polymerizable hydrocarbons is advantageously used.

Hydrocarbons having at least 8 carbon atoms contained in the fraction are almost all aromatic hydrocarbons, the major proportion of which consists of aromatic hydrocarbons containing 9 or 10 carbon atoms. The total amount of such aromatic hydrocarbons with 9 or 10 carbon atoms is 50 to 95% by weight, usually 60 to 95% by weight, based on the weight of the fraction. The fraction contains some amounts of aromatic hydrocarbons containing 8 carbon atoms and more than 10 carbon atoms.

Typical examples of the cationically polymerizable hydrocarbons contained in the fraction are cationically polymerizable aromatic hydrocarbons containing 8 to 12 carbon atoms, such as styrene, α- or β-methylstyrene, o-, m- or p-vinyltoluene, indene, methylindene, or divinylbenzene. Other non-typical cationically polymerizable aromatic hydrocarbons include $C_8$ to $C_{12}$ olefins and/or diolefins such as dicyclopentadiene or methyldicyclopentadiene which are present in minor quantities.

On the other hand, typical examples of the non-polymerizable hydrocarbons contained in the fraction include $C_8$ to $C_{12}$ aromatic hydrocarbons such as xylene, ethylbenzene, cumene, ethyltoluene, n-propylbenzene, trimethylbenzene, indane, methylindane, naphthalene, methylnaphthalene, and dimethylnaphthalene. Other examples of the non-polymerizable hydrocarbons are $C_8$ to $C_{12}$ paraffins and/or naphthenes which are present in small amounts.

As stated hereinabove, the composition of the petroleum cracking or reforming fraction used in this invention changes over a wide range according, for example, to the petroleum cracked or reformed, and the cracking or reforming conditions, and cannot be definitely determined. Generally, the fraction preferably has a bromine value of 50 to 90. Fractions having the following compositions are especially preferably used. It should be noted however that the present invention is not limited to the following exemplification.

| Components | Amounts in percent by weight |
| --- | --- |
| Cationically polymerizable aromatic hydrocarbons | 25 to 75, preferably 30 to 60 |
| Olefins | 1 to 15, preferably 5 to 10 |
| Diolefins | 0 to 5, preferably 1 to 3 |
| Non-polymerizable aromatic hydrocarbons | 15 to 50, preferably 20 to 40 |
| Paraffins and naphthenes | 5 to 25, preferably 10 to 25 |

Typical examples of the olefins and diolefins given in the above table are aliphatic mono- and di-olefins containing 9 to 12 carbon atoms. The non-polymerizable aromatic hydrocarbons are typified by $C_9$ to $C_{12}$ alkylbenzenes (main components), indane and $C_9$ to $C_{11}$ derivatives thereof with traces of benzene, toluene and xylene, and naphthalene and $C_{11}$ to $C_{12}$ derivatives thereof. Typical examples of the paraffins and naphthenes are paraffins and naphthenes containing 9 to 12 carbon atoms.

The cationically polymerizable aromatic hydrocarbon component in the fraction typically consists of the following components.

| Components | | Amounts in % by weight * |
| --- | --- | --- |
| Vinyl toluene | Total | 30 to 85, preferably 35 to 70 |
| Indene | | |
| Styrene | | |
| α-Methylstyrene | Total | 5 to 50, preferably 15 to 40 |
| Methylindene | | |
| β-Methylstyrene | | |

*The amounts are based on the total weight of the cationically polymerizable aromatic hydrocarbons.

The petroleum cracking or reforming fraction can be used either directly, or if desired, after having been subjected to a purifying step such as distillation to separate at least part of the non-polymerizable hydrocarbons and increase the content of the cationically polymerizable hydrocarbons.

The important feature of the process of this invention is that prior to the polymerization, the petroleum cracking or reforming fraction is heat-treated at a temperature of 50° to 250° C. together with an α,β-unsaturated dicarboxylic acid anhydride. This heat-treatment has been found to be effective for the removal from the fraction of detrimental substances which are the causes of coloration, reduced thermal stability and offensive odor of a hydrocarbon resin obtainable by polymerization of the fraction.

The α,β-unsaturated dicarboxylic acid anhydride that can be used in this invention includes organic compounds containing two carboxyl groups bonded to each other in the form of anhydride and an unsaturated bond, especially a double bond, between the carbon atoms (α-carbon atom) to which one of the carboxyl groups is bonded and a carbon atom adjacent thereof (β-carbon atom). Suitable anhydrides are aliphatic of alicyclic α,β-unsaturated dicarboxylic acid anhydrides containing up to 15 carbon atoms, preferably 4 to 10 carbon atoms. Especially preferred α,β-unsaturated carboxylic acid anhydrides include maleic anhydride, itaconic anhydride, citraconic anhydride, $\Delta^1$-tetrahydrophthalic anhydride, and $\Delta^2$-tetrahydrophthalic anhydride. Of these, the aliphatic α,β-unsaturated dicarboxylic acid anhydrides, especially maleic anhydride, are especially suitable.

The amount of the α,β-unsaturated dicarboxylic acid anhydride is not critical, and can be varied over a wide range according, for example, to the type of the petroleum fraction to be treated or the temperature of the heat-treatment. Generally, the amount is at least 0.5% by weight, preferably 1 to 20% by weight, more preferably 2 to 10% by weight, based on the weight of the cationically polymerizable hydrocarbons in the petroleum cracking or reforming fraction.

The heat-treatment of the fraction with the α,β-unsaturated dicarboxylic acid anhydride is carried out at a temperature of 50° to 250° C., preferably 70° to 200° C., most preferably 90° to 150° C. The heat-treatment can be performed usually at atmospheric pressure, but if desired, at elevated or reduced pressures. The heat-treatment time is not critical, and can be varied over a wide range according, for example, to the type of the fraction, the type or amount of the acid anhydride, or the heat-treatment temperature. Generally, the heat-treatment time is at least 0.5 minute, preferably 1 minute to 10 hours, more preferably 30 minutes to 5 hours.

The heat-treatment exhibits a fully satisfactory effect when performed using the α,β-unsaturated dicarboxylic acid anhydride alone. It has been found in accordance with this invention that when this heat-treatment is carried out in the presence of an acid, a hydrocarbon resin obtained by polymerizing the treated fraction shows a further improvement in its color, thermal stability and odor.

Thus, another important feature of the present invention is that the heat-treatment of the petroleum fraction is carried out in the presence of an acid.

The term "acid", as used herein, denotes not only acidic substances in its narrow sense, but also acids in general in its broad sense, and also include acting as electron acceptors, Lewis acids and Bronsted acids (proton acids) as proton donors, which act as electron acceptors.

Suitable Lewis acids that can be used in this invention are metal halides having a vacant orbit at the central metal atom. Examples of metal atoms constituting such compounds are metal atoms having an atomic number of 5, 13, 21 - 32, 39 - 50 and 72 - 81. Preferred metal atoms are those of Groups IB, IIIA, IVA, IVB, VIB, VIIB and VIII of the periodic table, and B, Al, Sn, Fe, Ti, Cr and Cu are especially preferred.

Specific examples of such Lewis acids are aluminum trichloride, ethyl aluminum dichloride, aluminum tribromide, boron trifluoride or its organic complexes, stannic chloride or its hydrate, stannic bromide or its hydrate, ferric chloride or its hydrate, ferric bromide or its hydrate, gallium trifluoride, gallium trichloride, gallium tribromide, zinc chloride, cupric chloride or its hydrate, chromic chloride or its hydrate, chromic bromide or its hydrate, molybdenum pentafluoride, molybdenum pentachloride, molybdenum pentabromide, tungsten hexafluoride, tungsten hexachloride, tungsten hexabromide, tungsten hexafluoride, tungsten pentachloride, rhenium hexachloride, rhenium hexabromide, rhenium pentachloride, rhenium pentabromide, titanium tetrafluoride, titanium tetrachloride and titanium tetrabromide. Of these, compounds frequently used as Friedel-Crafts catalysts, especially aluminum trichloride, boron trifluoride or its complexes (for example, boron trifluoride/ether complex, or boron trifluoride/phenol complex), stannic chloride or its hydrate, ferric chloride or its hydrate, cupric chloride or its hydrate, and titanium tetrachloride are the especially preferred Lewis acids.

Examples of Bronsted acids that can be used in this invention include organic proton acids, for example, phenols such as phenol, cresol, hydroquinone, resorcinol or catechol, organic carboxylic acids such as acetic acid, monochloroacetic acid, dichloroacetic acid, trichloroacetic acid, propionic acid, mono-, di- or trichloro-propionic acid, butyric acid, and mono-, di- or trichlorobutyric acid, and organic sulfonic acids such as benzenesulfonic acid or p-toluenesulfonic acid; and inorganic proton acids such as hydrochloric acid, hydrogen chloride, hydrofluoric acid, hydrobromic acid, hydroiodic acid, sulfuric acid, nitric acid, phosphoric acid, and perchloric acid.

"Solid acids", such as silica gel, alumina gel, silica-alumina gel, diatomaceous earth, activated clay and cation exchange resins, can also be used in this invention as the acid.

The cation exchange resins are, for example, carboxylic acid-type cation exchange resins, and sulfonic acid-type cation exchange resins. Commercially available carboxylate-type cation exchange resins or sulfonate-type cation exchange resins are normally used after being converted to carboxylic acid-type cation exchange resins or sulfonic acid-type cation exchange resins by reaction with acids.

The Lewis acids and solid acids are especially suitable for the process of the invention.

The amount of the acid is not critical, and can be varied over a broad range according, for example, to the type of the fraction used, the type or amount of the $\alpha,\beta$-unsaturated dicarboxylic acid, or the heat-treatment conditions. Generally, the amount of the acid is at least 0.005% by weight based on the total weight of the cationically polymerizable hydrocarbons. There is no particular upper limit, but the use of too much acid is not economical. Hence, the amount is usually up to 30% by weight, preferably 0.01 to 20% by weight, more preferably 0.05 to 5% by weight.

When the solid acid is used, it can be contacted with the starting petroleum fraction by a fixed bed or fluidized bed method. The advantageous residence time in this case is 1 minute to 10 hours.

The petroleum cracking or reforming fraction so heat-treated can be directly subjected to a polymerization step to be described. It is usually advantageous however that prior to the polymerization, sparingly volatilizable components having a boiling point of more than 280° C., preferably more than 265° C., are removed as distillation bottoms by distillation such as flash distillation or vacuum distillation, and/or the fraction is washed with an alkaline aqueous solution, such as an aqueous solution of sodium hydroxide or ammonia having a concentration of 0.05 to 5% by weight.

The petroleum cracking or reforming fraction so treated which contains cationically polymerizable hydrocarbons is then polymerized in the presence of a catalyst to produce hydrocarbon resins.

The polymerization can be carried out by any known method used in the production of ordinary hydrocarbon resins.

Polymerization catalysts normally used in this invention are Friedel-Crafts catalysts such as boron trifluoride, boron trifluoride complexes (e.g., boron trifluoride/phenol complex), aluminum trichloride, aluminum tribromide, tin tetrachloride, and titanium tetrachloride. These polymerization catalysts can be used in an amount of generally 0.1 to 5% by weight, preferably 0.5 to 3% by weight, according to their abilities.

The polymerization can be carried out usually at a temperature of $-30°$ to 80° C., preferably $-10°$ to 50° C., more preferably 10° to 40° C. Atmospheric pressure suffices as the polymerization pressure. If desired, the polymerization may be carried out at elevated or reduced pressures in the range of 0.1 to 10 atmospheres.

Under the above-mentioned conditions, the polymerization can be completed usually within 30 minutes to 5 hours.

After the polymerization, the catalyst can be removed by such a treatment as washing with an alkali aqueous solution or with water, and the unreacted hydrocarbons or low polymers can be removed by a suitable means such as distillation. Advantageously, the distillation is carried out generally at a temperature of 150° to 250° C. and 5 mmHg to 100 mmHg. As a result, hydrocarbon resins can be obtained as distillation bottoms.

In the above polymerization, a small amount of another monomer copolymerizable with the cationically polymerizable hydrocarbons can be added to the petroleum fraction in order to modify them. For example, a petroleum cracking or reforming fraction containing cationically polymerizable $C_4$ or $C_5$ hydrocarbons and having a boiling range of $-20°$ to 100° C. can be added to the preheated petroleum fraction in an amount of 10 to 100% by weight, preferably 15 to 80% by weight.

The process of the present invention described hereinabove can afford aromatic hydrocarbon resins free from poor thermal stability, strong odor and a high degree of coloration which are the defects of the conventional aromatic hydrocarbon resins, and the resulting hydrocarbon resins have superior thermal stability, reduced coloration and little odor.

Another advantage of the process of this invention is that since any catalyst-poisoning components present in the starting petroleum cracking or reforming fraction can be removed by the heat-treatment of the fraction, the amount of the polymerization catalyst can be reduced as compared with the conventional methods.

Because of their high thermal stability, little odor and low degrees of coloration, the hydrocarbon resins produced by the process of this invention can be advantageously used as binder components in hot-melt adhesives, pressure-sensitive adhesives, and thermofusible traffic paints.

The following examples specifically illustrate the process of the present invention. The hydrocarbon resins produced in the following Examples and Comparative Examples were evaluated by the following methods.

(1) Thermal stability

Five grams of a hydrocarbon resins is taken into a test tube with an inside diameter of 16 mm, and the test tube is dipped for 3 hours in a constant-temperature tank maintained at 200° C. The color of the hydrocarbon resin is then compared with the Gardner standard color, and the thermal stability is expressed in terms of Gardner values.

(2) Odor

The odor which is given off when a hydrocarbon resin is heat-melted at 200° C. is rated on a scale of A, B, C and D in which A represents a weak odor and D represents an irritating odor.

(3) Color

The color of a starting petroleum fraction containing cationically polymerizable hydrocarbons is determined by taking 10 g of the fraction into a test tube with an inside diameter of 16 mm, comparing its color with the Gardner standard color, and expressing it in terms of Gardner values.

The color of the resulting hydrocarbon resin is determined by taking 10 g of the hydrocarbon resin into a test tube with an inside diameter of 16 mm, dipping it in a constant-temperature tank kept at 150° C., comparing the color of the resin in the heat-melted state with the Gardner standard color, and expressing it in terms of Gardner values.

EXAMPLES 1 TO 7 AND COMPARATIVE EXAMPLES 1 AND 2

To a naphtha cracking fraction (containing 49.3% by weight of cationically polymerizable hydrocarbons) having a boiling range of 140° to 240° C. and the composition shown in Table 1 was added 8.7% by weight, based on the total weight of the cationically polymerizable hydrocarbons, of maleic anhydride. The fraction was treated at each of the temperatures indicated in Table 2 for 2 hours with stirring. The treated fraction was distilled under reduced pressure, and a hydrocarbon oil distillate having a boiling point of up to 120° C./20 mmHg was recovered. The resulting hydrocarbon oil was polymerized at 35° C. for 2 hours after adding 0.5% by weight, based on the weight of the hydrocarbon oil, of a boron trifluoride-phenol complex catalyst. The catalyst was removed by decomposition with a 2% by weight aqueous solution of sodium hydroxide. The polymerization product was washed with water, and subjected to flash distillation at 210 to 220° C./20 mmHg to remove the unreacted oil and oligomers. Each of the hydrocarbon resins having the properties shown in Table 2 was obtained as distillation bottoms.

Table 1

Composition of the naphtha cracking fraction having a boiling range of 140 to 240° C.

| Components | Content (% by weight based on the weight of the naphtha cracking fraction) |
|---|---|
| Styrene | 2.4 |
| α-Methylstyrene | 1.8 |
| β-Methylstyrene | 2.3 |
| Dicyclopentadiene | 1.7 |
| Vinyltoluene (o-, m- and p-) | 22.8 |
| Indene | 14.9 |
| Methylindene | 3.4 |
| Xylene (o-, m- and p-) | 0.9 |

Table 1-continued

Composition of the naphtha cracking fraction having a boiling range of 140 to 240° C.

| Components | Content (% by weight based on the weight of the naphtha cracking fraction) |
|---|---|
| Ethylbenzene | 0.1 |
| Isopropylbenzene | 0.1 |
| Ethyltoluene (o-, m- and p-) | 6.1 |
| n-Propylbenzene | 0.5 |
| Trimethylbenzene (1,3,5-, 1,2,4- and 1,2,3-) | 13.8 |
|  | 13.8 |
| Indane | 2.3 |
| Methylindane | 0.6 |
| Naphthalene | 4.3 |
| Methylnaphthalene | 0.2 |
| Unidentifiable aromatics | 21.8 |

COMPARATIVE EXAMPLES 3 AND 4

The same naphtha cracking fraction as used in Example 1 was heat-treated in the absence of maleic anhydride under the conditions indicated in Table 2 and polymerized, and post-treated in the same way as in Example 1 (Comparative Example 3).

The same naphtha cracking fraction as used in Example 1 was directly polymerized and post-treated in the same way as in Example 1 without heat-treatment (Comparative Example 4).

The properties of the resulting hydrocarbon resins are shown in Table 2.

EXAMPLES 8 AND 9

The procedure of Example 3 was repeated except that itaconic anhydride or citraconic anhydride was used instead of the maleic anhydride. There were obtained hydrocarbon resins having the properties shown in Table 2.

EXAMPLES 10 AND 11

The same naphtha cracking fraction as used in Example 1 was heat-treated under the conditions indicated in Table 2 by using varying amounts, as shown in Table 2, of maleic anhydride, and then polymerized and post-treated in the same way as in Example 1. Thus, hydrocarbon resins having the properties shown in Table 2 were obtained. The results of Table 2 demonstrate that the hydrocarbon resins obtained by the process of this invention have markedly improved color, thermal stability and odor.

EXAMPLES 12 TO 23

The same naphtha cracking fraction as used in Example 1 was treated with maleic anhydride under the conditions shown in Table 3 in the presence of various acids shown in Table 3, and then polymerized and post-treated in the same way as in Example 1. Hydrocarbon resins having the properties shown in Table 3 were obtained.

The results of Table 3 show that when the preheating is carried out in the presence of acids, the resulting hydrocarbon resins have more improved color, thermal stability and odor over the case of not using the acids.

EXAMPLES 24 TO 39

To the same naphtha cracking fraction as used in Example 1 were added the α,β-unsaturated dicarboxylic anhydrides and cation exchange resins indicated in Table 4, and the fraction was heat-treated for 2 hours with stirring under the conditions shown in Table 4. The reaction mixture was distilled, and a distillate hydrocarbon oil having a boiling point of up to 120° C./20 mmHg was recovered. The hydrocarbon oil was then polymerized at 35° C. for 2 hours after adding 0.5% by weight of a boron trifluoride/phenol complex. The catalyst was then removed by decomposition with a 2% by weight aqueous solution of sodium hydroxide. The product was washed with water, and subjected to flash distillation at 210° to 220° C./30 mmHg to remove the unreacted hydrocarbon oil and low polymers. Each of the hydrocarbon resins having the properties shown in Table 4 was obtained as a distillation residue.

Table 2

| Example (Ex.) or Comparative Example (CE.) | Heat-treating conditions | | | | | Heat-treated fraction | | Hydrocarbon resin | | | | |
|---|---|---|---|---|---|---|---|---|---|---|---|---|
| | Treating agent (wt.%) (*a) | | Temperature (° C.) | Time (hrs.) | Purification | Yield (wt.%) | Color (Gardner) | Yield (wt.%) (*b) | Softening point (° C.) | Color (Gardner) | Thermal stability (Gardner) | Odor |
| Ex. 1 | Maleic anhydride | (8.1) | 70 | 2 | Distillation | 94 | 4 | 42 | 134 | 8 | 12 | B |
| Ex. 2 | " | | 50 | " | " | 95 | 5 | 1 | 136 | 8.5 | 13 | C |
| Ex. 3 | " | | 100 | " | " | 93 | 4 | 42 | 135 | 8 | 12 | B |
| Ex. 4 | " | | 130 | " | " | 92 | 4 | 42 | 134 | 8 | 12 | B |
| Ex. 5 | " | | 150 | " | " | 91 | 4 | 41 | 132 | 8 | 12 | B |
| Ex. 6 | " | | 200 | " | " | 89 | 4 | 40 | 130 | 8 | 12 | B |
| Ex. 7 | " | | 230 | " | " | 87 | 4.5 | 39 | 127 | 8.5 | 13 | B |
| CE. 1 | " | | 30 | " | " | 97 | 6.5 | 38 | 135 | 10 | 14.5 | C |
| CE. 2 | " | | 260 | " | " | 83 | 6 | 35 | 121 | 10 | 15 | B |
| CE. 3 | Not added | | 100 | " | " | 97 | 7 | 39 | 135 | 11 | 16 | D |
| CE. 4 | " | | — | — | — | — | 7 | 38 | 134 | 11.5 | 16 | D |
| Ex. 8 | Itaconic anhydride | (8.1) | 100 | 2 | Distillation | 93 | 4 | 2 | 32 | 8 | 12.5 | B |
| Ex. 9 | Citraconic anhydride | (8.1) | " | " | " | 94 | 5 | 42 | 135 | 8.5 | 12.5 | B |
| Ex. 10 | Maleic anhydride | (1.0) | " | 5 | " | 95 | 5 | 42 | 134 | 8.5 | 13 | B |
| Ex. 11 | Maleic anhydride | (18.3) | " | 1 | " | 91 | 4 | 40 | 134 | 8 | 12 | B |

(*a): Based on the total weight of the cationically polymerizable hydrocarbons in the fraction.
(*b): Yield based on the heat-treated fraction.

Table 3

| Example | Heat-treating conditions | | | | | | Heat-treated fraction | | Hydrocarbon resin | | | | |
|---|---|---|---|---|---|---|---|---|---|---|---|---|---|
| | Maleic anhydride (wt.%) ** | Acid (wt.%) | | Temperature (° C.) | Time (hrs.) | Purification | Yield (wt.%) | Color (Gardner) | Yield (wt.%) *** | Softening point (° C.) | Color (Gardner) | Thermal stability (Gardner) | Odor |
| 12 | 6.1 | $FeCl_3 \cdot 6H_2O$ | (0.2) | 130 | 2 | Distillation | 92 | 1 | 44 | 133 | 6.5 | 10 | A |
| 13 | 4.1 | $FeCl_3 \cdot 6H_2O$ | (0.1) | 100 | " | " | 92 | 2.5 | 45 | 135 | 7 | 10.5 | A |
| 14 | 6.1 | $FeCl_3$ | (0.2) | " | " | " | 89 | 1 | 44 | 131 | 6.5 | 10.5 | A |
| 15 | 2.0 | $FeCl_3$ | (0.1) | " | 1 | " | 91 | 2 | 44 | 133 | 7 | 11 | A |
| 16* | 6.1 | $BF_3$-ether complex | (0.05) | " | " | (1) Alkali washing (2) Distillation | 89 | 2 | 43 | 130 | 7 | 10.5 | A |
| 17 | 4.1 | $AlCl_3$ | (0.05) | " | " | Distillation | 88 | 2.5 | 43 | 129 | 7 | 10.5 | A |
| 18 | 6.1 | $CuCl_2 \cdot 2H_2O$ | (0.2) | " | 2 | " | 93 | 2 | 45 | 33 | 7 | 11 | A |
| 19 | " | $ZnCl_2$ | (0.2) | " | " | " | 94 | 2 | 4 | 135 | 7.5 | 11 | A |
| 20 | 6.1 | $CrCl_3$ | (0.2) | 100 | 2 | Distillation | 94 | 2.5 | 44 | 134 | 7 | 10.5 | A |
| 21* | 4.1 | Trichloroacetic acid | (0.1) | " | 1 | (1) Alkali washing (2) Distillation | 94 | 2.5 | 43 | 131 | 7.5 | 11 | A |
| 22 | " | Hydroquinone | (0.5) | " | " | Distillation | 94 | 1 | 45 | 133 | 6.5 | 10 | A |
| 23* | 6.1 | Toluenesulfonic acid | (0.2) | " | 2 | (1) Alkali washing (2) Distillation | 93 | 2 | 43 | 135 | 7 | 11 | A |

*After the heat-treatment, the fraction as washed with alkali and distilled.
**Based on the total amount of the cationically polymerizable hydrocarbons in the fraction.
***Yield based on the heat-treated fraction.

Table 4

| Example | Heat-treating conditions | | | | | | | Heat-treated fraction | | Hydrocarbon resin | | | | |
|---|---|---|---|---|---|---|---|---|---|---|---|---|---|---|
| | α,β-unsaturated dicarboxylic anhydride (wt.%) | (*1) | Cation-exchange resin (wt.%) | (*1) | Temperature (° C.) | Time (hrs.) | Purification | Yield (wt.%) | Color (Gardner) | Yield (wt.%) | Softening point (° C.) | Color (Gardner) | Thermal stability (Gardner) | Odor |
| 24 | Maleic anhydride | (4.1) | Amberlite IRC-50 | (0.22) | 100 | 2 | Distillation | 91 | 3.0 | 39 | 134 | 7 | 13 | A |

Table 4-continued

| Example | α,β-unsaturated dicarboxylic anhydride (wt.%) | (*1) | Cation-exchange resin (wt.%) | (*1) | Temperature (°C.) | Time (hrs.) | Purification | Heat-treated fraction Yield (wt.%) | Heat-treated fraction Color (Gardner) | Hydrocarbon resin Yield (wt.%) | Softening point (°C.) | Color (Gardner) | Thermal stability (Gardner) | Odor |
|---|---|---|---|---|---|---|---|---|---|---|---|---|---|---|
| 25 | " | (") | (*1) Amberlist −15 | (2.2) | " | " | " | 87 | below 1 | 35 | 135 | 5 | 12 | A |
| 26 | " | (") | (*3) " | (1.1) | " | " | " | 88 | below 1 | 36 | 135 | 5 | 12 | A |
| 27 | " | (") | " | (") | " | " | Distillation after alkali washing | 90 | 1.5 | 37 | 133 | 5.5 | 12.5 | A |
| 28 | " | (") | " | (0.22) | " | " | Distillation | 90 | Below 1 | 38 | 134 | 5 | 12 | A |
| 29 | " | (") | " | (") | " | " | Distillation after alkali washing | 90 | 1.5 | 37 | 134 | 6 | 12.5 | A |
| 30 | " | (") | " | (") | " | 1 | Distillation | 91 | 1 | 38 | 134 | 5.5 | 12 | A |
| 31 | " | (") | " | (") | " | 0.5 | " | 90 | 1 | 35 | 133 | 6 | 12.5 | A |
| 32 | Maleic anhydride | (4.1) | Amberlist −15 (*3) | (0.22) | 80 | 2 | Distillation | 91 | 2 | 35 | 134 | 6.5 | 12.5 | A |
| 33 | " | (") | " | (") | 60 | " | " | 92 | 2 | 36 | 133 | 5.5 | 12 | A |
| 34 | " | (") | " | (") | 50 | " | " | 92 | 2 | 38 | 130 | 7 | 13 | A |
| 35 | " | (2.0) | " | (") | 100 | " | " | 93 | 3.5 | 38 | 132 | 8 | 12 | A-B |
| 36 | " | (6.1) | " | (") | " | " | " | 91 | below 1 | 37 | 133 | 5.5 | 12 | A |
| 37 | " | (8.1) | " | (") | " | " | " | 88 | below 1 | 35 | 134 | 5.5 | 12 | A |
| 38 | Itaconic anhydride | (8.1) | " | (") | " | " | " | 90 | 3 | 39 | 131 | 7 | 12 | A |
| 39 | Citraconic anhydride | (8.1) | " | (") | " | " | " | 91 | 4 | 40 | 132 | 7.5 | 12 | A |

(*1)Based on the total weight of the cationically polymerizable hydrocarbons in the fraction.
(*2)Trademark for a carboxylic acid salt-type cation exchange resin made by Rohm & Hass Co. Before use, it was washed twice with each of toluene, ethanol and distilled water, then treated with a 5% by weight aqueous solution of hydrochloric acid, and washed with distilled water, followed by drying.
(*3)Trademark for a sulfonic acid salt-type cation exchange resin made by Rohm & Hass Co. Prior to use, it was treated in the same way as shown in (*2) above.

EXAMPLE 40

0.5 part by weight of a boron trifluoride-phenol complex catalyst was added to a mixture consisting of 80 parts by weight of the treated fraction obtained in Example 14 and 20 parts by weight of naphtha cracking fraction having a boiling range of from −20° to +20° C. and the compositions shown in Table 5 (a content of the unsaturated hydrocarbon components of 94.1% by weight), and polymerized at 30° C. for 2 hours. The post-treatment was carried out in the same way as in Example 1 to thereby obtain the hydrcarbon resins having the properties shown in Table 7.

EXAMPLE 41

0.5 part by weight of a boron trifluoride-phenol complex catalyst was added to a mixture consisting of 70 parts by weight of the treated fraction obtained in Example 14 and 30 parts by weight of naphtha cracking fraction having a boiling range of from 20° to 100° C. and the compositions shown in Table 6 (a content of the unsaturated hydrocarbon components of 53.3% by weight), and polymerized at 30° C. for 2 hours. The post-treatment was carried out in the same way as in Example 1 to thereby obtain the hydrocarbon resins having the properties shown in Table 7.

Table 5
Composition of the naphtha cracking fraction having a boiling range of −20 to +20° C.

| Components | Content (% by weight based on the weight of the naphtha cracking fraction) |
|---|---|
| propylene | 0.5 |
| iso-butane | 0.5 |
| n-butane | 4.6 |
| 1-butene | 20.7 |
| iso-butene | 25.5 |
| trans-2-butene | 7.6 |
| cis-2-butene | 5.6 |
| 1,3-butadiene | 34.2 |
| $C_5$ paraffin | 0.8 |

Table 6
Composition of the naphtha cracking fraction having a boiling range of 20 to 100° C.

| Components | Content (% by weight based on the weight of the naphtha cracking fraction) |
|---|---|
| iso-pentane | 16.3 |
| n-pentane | 19.4 |
| 1-pentene | 6.9 |
| 2-methyl-1-butene | 9.0 |
| 2-pentene | 2.4 |
| 2-methyl-2-butene | 3.2 |
| 2-methylpentane | 3.5 |
| isoprene | 14.6 |
| piperylene | 11.0 |
| cyclopentadiene | 2.7 |
| other $C_5$ paraffin | 9.6 |
| methylcyclopentadiene | 0.0 |

Table 6-continued

Composition of the naphtha cracking fraction having a boiling range of 20 to 100° C.

| Components | Content (% by weight based on the weight of the naphtha cracking fraction) |
|---|---|
| other $C_6$-$C_7$ fractions | 1.4 |

Table 7

| Example | Heat-treating conditions | | | | | Heat-treated fraction | | Hydrocrbon resin | | | | |
|---|---|---|---|---|---|---|---|---|---|---|---|---|
| | Maleic anhydride (wt.%) | Acid (wt.%) | Temperature (° C.) | Time (hrs.) | Purification | Yield (wt.%) | Color (Gardner) | Yield (wt.%) | Softening point (° C.) | Color (Gardner) | Thermal stability (Gardner) | odor |
| 40 | 6.5 | $FeCl_3$ (0.2) | 100 | 2 | Distillation | 89 | 2.5 | 47 | 93 | 6 | 10 | A |
| 41 | " | " | " | " | " | " | " | 45 | 87 | 6 | 10 | A |

What we claim is:

1. A process for producing a hydrocarbon resin having improved color and thermal stability, which comprises heat-treating a petroleum cracking or reforming fraction containing cationically polymerizable hydrocarbons and having a boiling range of from 140° C to 280° C, with an α,β-unsaturated dicarboxylic acid anhydride at a temperature of from 50° C to 250° C, and polymerizing said heat-treated petroleum fraction in the presence of a polymerization catalyst.

2. The process of claim 1 wherein the α,β-unsaturated dicarboxylic acid anhydride is selected from aliphatic or alicyclic α,β-unsaturated dicarboxylic acid anhydrides containing up to 15 carbon atoms.

3. The process of claim 1 wherein the α,β-unsaturated dicarboxylic acid anhydride is a member selected from the group consisting of maleic anhydride, itaconic anhydride, citraconic anhydride and tetrahydrophthalic anhydride.

4. The process of claim 1 wherein the α,β-unsaturated dicarboxylic acid anhydride is maleic anhydride.

5. The process of claim 1 wherein the amount of the α,β-unsaturated dicarboxylic acid anhydride is at least 0.5% by weight based on the total weight of the cationically polymerizable hydrocarbons.

6. The process of claim 1 wherein the amount of the α,β-unsaturated dicarboxylic acid anhydride is 1 to 20% by weight based on the total weight of the cationically polymerizable hydrocarbons.

7. The process of claim 1 wherein the heat-treatment is carried out at a temperature of from 70° to 200° C.

8. The process of claim 1 wherein the heat-treatment is carried out for at least 0.5 minute.

9. The process of claim 1 wherein the heat-treatment is carried out for 1 minute to 10 hours.

10. The process of claim 1 wherein the heat-treatment is carried out in the presence of an acid.

11. The process of claim 10 wherein the acid is selected from Lewis acids and Bronsted acids.

12. The process of claim 10 wherein the acid is a solid acid.

13. The process of claim 10 wherein the amount of the acid is at least 0.005% by weight based on the total weight of the cationically polymerizable hydrocarbons.

14. The process of claim 10 wherein the amount of the acid is 0.01 to 20% by weight based on the total weight of the cationically polymerizable hydrocarbons.

15. The process of claim 1 wherein the heat-treated fraction is distilled and/or washed with an alkali aqueous solution before the polymerization.

16. The process of claim 1 wherein the petroleum cracking or reforming fraction contains at least 20% by weight of the cationically polymerizable hydrocarbons based on the weight of the fraction.

* * * * *